May 22, 1934.  F. M. OPITZ  1,959,637
RADIATOR CORE AND METHOD OF MAKING SAME
Filed May 11, 1931  4 Sheets-Sheet 1

Inventor:
Fred M. Opitz
By Brown, Jackson, Boettcher & Dienner
Attys.

May 22, 1934.  F. M. OPITZ  1,959,637
RADIATOR CORE AND METHOD OF MAKING SAME
Filed May 11, 1931   4 Sheets-Sheet 2

Inventor:
Fred M. Opitz
By Brown Jackson Boettcher Dienner
Attys.

May 22, 1934.                F. M. OPITZ                 1,959,637
                RADIATOR CORE AND METHOD OF MAKING SAME
                       Filed May 11, 1931        4 Sheets-Sheet 3
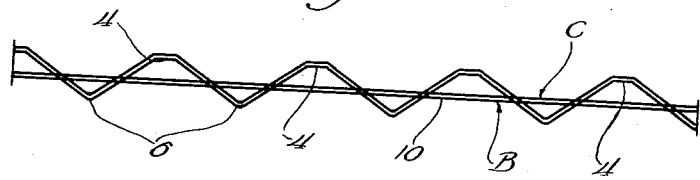
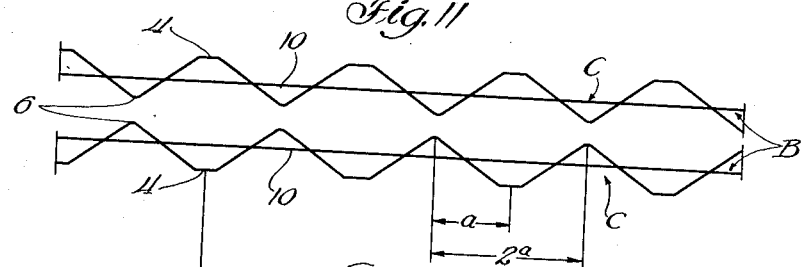
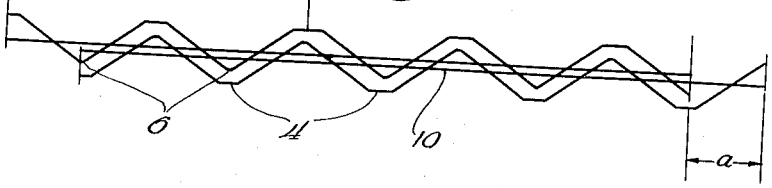
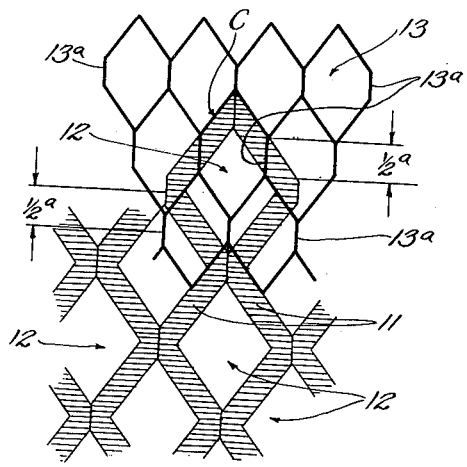
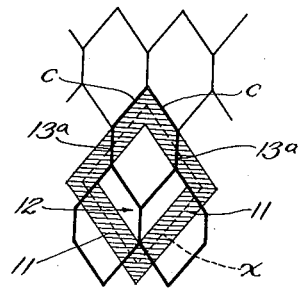
Inventor:
Fred M. Opitz
By Brown Jackson Boettcher & Dienner
Attys.

May 22, 1934.  F. M. OPITZ  1,959,637
RADIATOR CORE AND METHOD OF MAKING SAME
Filed May 11, 1931  4 Sheets-Sheet 4

Inventor:
Fred M. Opitz
By Brown Jackson Boettcher & Dienner
Attys.

Patented May 22, 1934

1,959,637

UNITED STATES PATENT OFFICE 1,959,637

RADIATOR CORE AND METHOD OF MAKING SAME

Fred M. Opitz, Milwaukee, Wis., assignor to Hexcel Radiator Company, Milwaukee, Wis., a corporation of Wisconsin Application May 11, 1931, Serial No. 536,330

24 Claims. (Cl. 113—118)

My invention relates to radiators and the like, and is more particularly concerned with the method or process of forming the sheet metal of which the radiator core is constructed, and further relates to the structure resulting from the assemblage of the sheet metal manipulated in accordance with the provisions of my present invention.

The radiator made by my present invention is covered by my prior Patent No. 1,404,160 of January 17, 1922, upon which the present invention is an improvement.

One of the objects of the present invention is to convert a flat strip of sheet metal, preferably of brass, copper, bronze, or other similar workable metal, into a suitably formed half tube with a minimum number of operations to simplify the manufacture thereof.

The strips may be formed into half tubes in any suitable type of press or stamping machine, preferably in machines of the type disclosed in my prior Patents Nos. 1,341,721 and 1,618,219 of June 1st, 1920, and February 22, 1927, respectively.

The finished radiator is made up of a plurality of the strips or sheets all of which are of like shapes. They are however, placed face to face or back to back to form alternately the water tubes or water legs and the air spaces through which the air passes to dissipate the heat. The strips or sheets are provided with marginal loops for the purpose of spacing the sheets properly and to hold them together in their proper relations when solder is applied. The loops further constitute an ornamental and protective facing for the water tubes.

The strips or sheets constructed in accordance with the present invention are provided with corrugations which are so formed and related to the marginal loops that, on placing the sheets face to face with the adjacent loops in proper position, a tortuous or zigzag water tube results. Such a tube provides additional radiation surface as contrasted with a vertical tube having a substantially straight water channel.

It is frequently desirable in radiator construction to provide water tubes or water legs that are uniform in their cross sectional area so that the water channel or passageway will not be variable. Under some conditions when a water tube is so constructed as to have its water channel of variable cross sectional area the free flow of water therethrough may be hindered by the restricted portions, and inefficient dissipation of heat will result. The water will naturally seek its way through the tubes least restricted at a greater rate than through the restricted tubes, and the additional burden of dissipating the heat will fall upon the tubes receiving the greatest flow of water. Such a construction is inefficient in its operation. In order to obtain a uniform cross sectional area throughout the water tube or water leg in a radiator of the present construction, I have provided the strip or sheet with a regularly and perfectly formed corrugation running throughout the length of the sheet and centrally thereof. When any two of the sheets are placed together face to face, the foregoing corrugated portions are made to intermesh and fix the relation of the two sheets longitudinally to one another in such a manner that the channel forming surfaces are properly spaced from one another to form a water tube or water leg having a uniform cross sectional area. The relative positions of any two of the sheets, as determined by the intermeshing of the centrally disposed corrugation, is also instrumental in determining the relative longitudinal positions of the marginal loops that form the ornamental and protective faces of the radiator.

In addition to both of the foregoing functions performed by the centrally disposed corrugations, the latter also increases the transverse radiation surface of the sheets and, furthermore, strengthens the tube-forming corrugations of the sheets in a direction longitudinally of the sheet as will hereinafter be described.

Other novel features and advantages relating to radiators constructed in accordance with my present invention will hereinafter appear in the following detailed description, having reference to the drawings wherein a preferred embodiment of the invention is disclosed.

Figures 10 to 16 are diagrammatic views showing the method of assembling the tube strips and the structural relations between the various loops, grooves and ridges; and Figures 17 and 18 are diagrammatic sketches showing the relation between the form and number approximately hexagonal air cells or passages forming the ornamental and protective face of the radiator and the form and number of the water cells.

Figure 2:
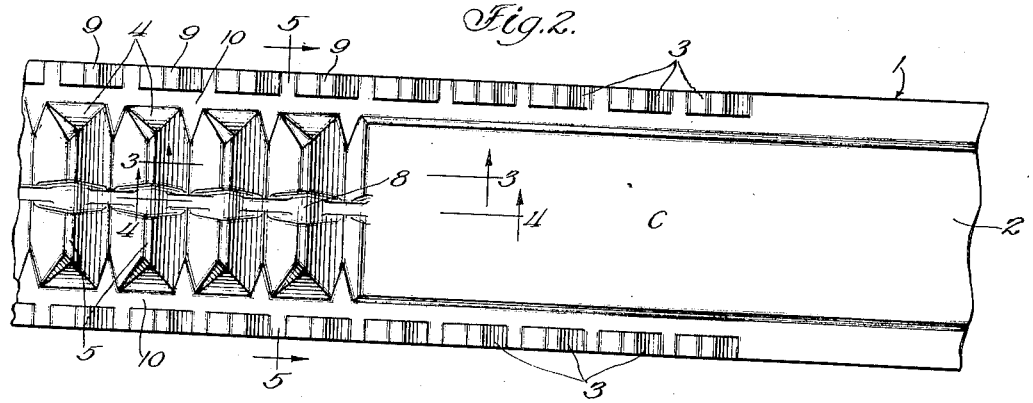
Figure 2 illustrates the same strip shown in Figure 1, but is a view looking at the reverse side thereof and showing the surface with which air comes into contact.
Figure 3:
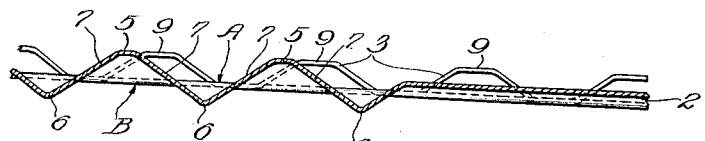
Figure 3 is a fragmentary cross sectional view taken longitudinally of the strip and substantially along the line 3—3 of Figure 2.
Figure 4:
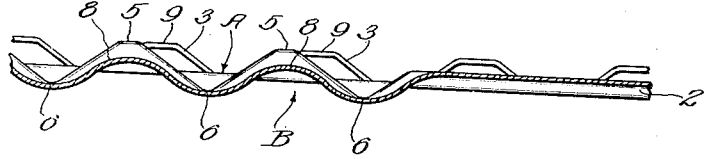
Figure 4 is another cross sectional view corresponding to that shown in Figure 3 but taken centrally and lonigtudinally of the strip substantially along the line 4—4 of Figure 2 and showing the form of the spacing corrugation.
Figure 5:
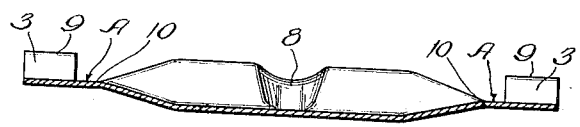
Figure 5 is a transverse cross sectional view of the strip taken substantially along the line 5—5 of Figure 2.

I employ a suitable stock or metal strip 1 of brass, bronze, copper or other malleable material, which is first formed with a channel or gutter 2 by pressing the central portion below the margins. The next operation consists of striking out a part of the marginal edges of the strip into loops 3 which are preferably semi-hexagonal in shape and which form the ornamental and protective facing for the radiator core when the strips 1 are assembled. The third and final step is to form the channel portion 2 of the strip 1 into the configuration best illustrated in Figures 1 and 2. In the latter operation the strip is formed into a plurality of corrugations 4, and referring to Figures 2 and 3, it will be seen that the metal is stretched or worked so that the upper ridges 5 of the corrugations are flat and substantially in the same plane as the ridges or crowns of the semi-hexagonal loops 3, with reference to the original surface A of the strip 1. The lower ridges 6 are dropped below the surface A, and substantially flat and sloping walls 7 extend between the ridges 5 and 6 giving the central portion of the strip a tortuous or zigzag contour as is best viewed in the cross sectional view of Figure 3. The purpose of disposing the corrugations 4 first on one side and then on the other, alternately, of the plane of the original surface A is to prevent too great a stretch in the metal as that would cause the metal to be drawn out too thin and possibly fracturing the same. In this construction the metal forming the ridge portions 5 and 6 is expanded, so to speak, above and below the original surface A thereby dividing the amount of necessary stretch in two directions and as a result thereof obtaining a stronger thickness of wall in the expanded portion than would otherwise be obtained for the same depth of corrugation if it were expanded either totally above or totally below the surface of the original sheet.

When the last step is performed, a second corrugation 8 is pressed into the strip centrally thereof and in the longitudinal direction of the strip. This corrugation is substantially of the same pitch as the corrugations 4, but is composed of symmetrically shaped reverse curves which are made for the purpose of intermeshing with like corrugations of a duplicate sheet when the latter is placed face to face with the former.

Figure 1:
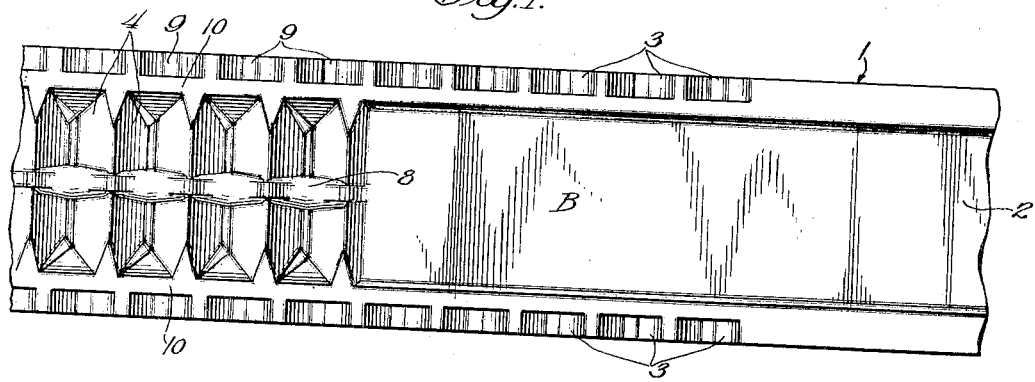
Figure 1 is a view of one of the sheets or strips which I employ in constructing a radiator core showing the surface which forms one of the inner walls of the water tube, and the different steps for forming the strip into its final shape are also here illustrated.

When I refer to the face of the sheet, I have reference to that side of the sheet which eventually forms the inner wall of a water tube, the same being indicated in Figure 1 by the letter B. In this same connection I have indicated in Figure 2 the back of the strip by the letter C.

Figure 9:
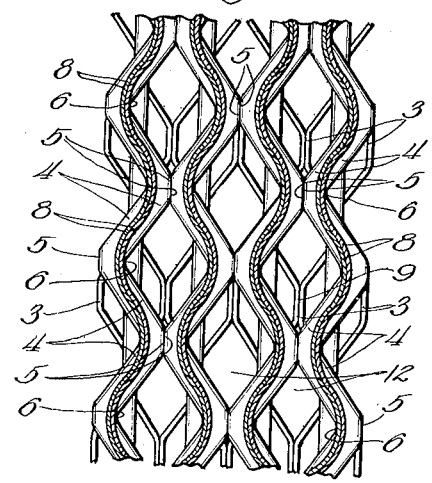
Figure 9 is another vertical cross sectional view through a fragmentary portion of the radiator core taken centrally thereof and substantially along the line 9—9 in Figure 7, and this particular section through the assembled strips corresponds to the sectional view in Figure 4 of one of the individual strips and shows how the spacing corrugations properly space the strips.

The corrugations 8 of the strips 1 provide means for positioning the pairs of correlated strips properly in the longitudinal direction, as is best illustrated in the cross sectional view in Figure 9, when the corrugations of two adjacent strips are in full contact one with the other. The corrugations 8 form depressions in the ridges 5 of the corrugations 4, and as a result the transverse surface dimension of each of the corrugations 4 is increased, providing additional surface for the dissipation of heat. A further advantage is gained with the use of corrugations such as 8, and that resides in the additional strength they give to the radiator core, the corrugations 8 thereby forming a reenforcing tie between each of the walls 7 that adjoin the ridges 5. The only possible weak spot where the strip may be subjected to bending is along the transverse ridge 6. However, when two of the strips 1 are assembled face to face, they are staggered in the manner clearly illustrated in Figure 9. Here it is seen that the deepest portions of each of the reenforced corrugations 8 of one strip are disposed opposite the weakest points of the other strip, namely, opposite to the ridges 6. In this manner the water tubes are strengthened in their longitudinal directions, and except for the inherent flexibility of the material, there will be no one place along the tubes which is weaker than any other portion of the tube.

The water tubes receive their strength in the transverse direction of the sheet by means of the corrugations 4, since the latter extend transversely of the sheet and prevent buckling of the sheet across the width of the water tubes.

It is further to be noted that the central corrugations 8 substantially divide the assembled sheets into a double water tube or water leg. Obviously, by providing two or more longitudinally extending corrugations 8 intermediate the length of the transverse corrugations 4, a plurality of water tubes may be obtained from each pair of sheets. However, this is merely a matter of choice depending upon the thickness of the radiator core and on the particular operating conditions under which the core is to be employed.

The radiator may be assembled in any known manner. I prefer to place the sheets alternately face to face and back to back in a jig or other holding means. Each pair of sheets forming one of the water tubes is properly alinged in the jig with the next adjacent pairs of sheets so that the crowns 9 of the loops 3 are brought into abutment in the manner illustrated in Figure 6. The loops 3 are so formed on the strips that, when the strips are brought together so that adjacent loops form a hexagon, see Figure 6, the ridges 5 of adjacent strips are in abutting engagement with one another. The ridges 5 will thus abut each other due to the fact that the height of the corrugations 4 from the normal surface A of the sheets is equal to the height of the loops.

Figure 6:
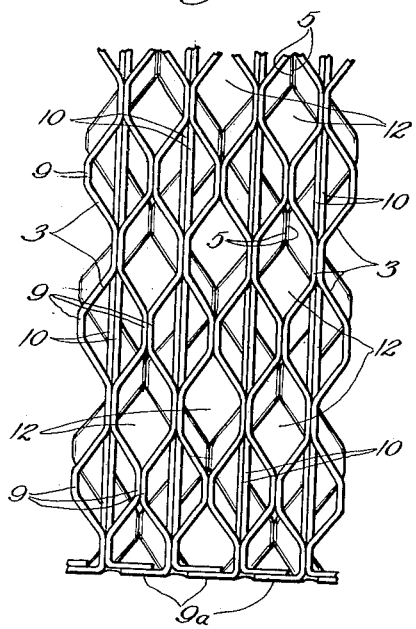
Figure 6 is a front elevational view of a fragmentary portion of the assembled radiator.

After the sheets or strips are all assembled, the ends are suitably cut to length and overlapped as indicated at 9a in Figure 6. Each face of the radiator core is then dipped into acid, followed by dipping the same to a predetermined depth into molten solder to join the individual sheets together into a rigid and well constructed radiator core.

Figure 8:
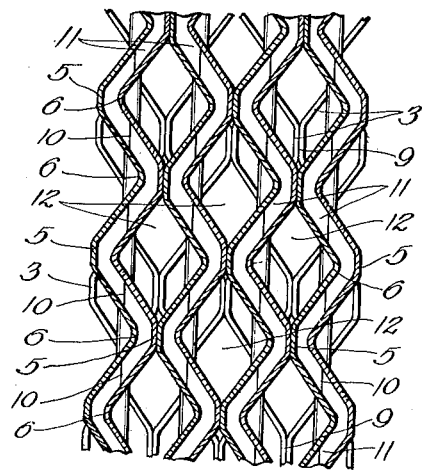
Figure 8 is a vertical cross sectional view through a fragmentary portion of an assembled radiator core as taken substantially along the line 8—8 in Figure 7, and this section through the assembled strips corresponds to the sectional view in Figure 3 of one of the individual strips.
Figure 7:
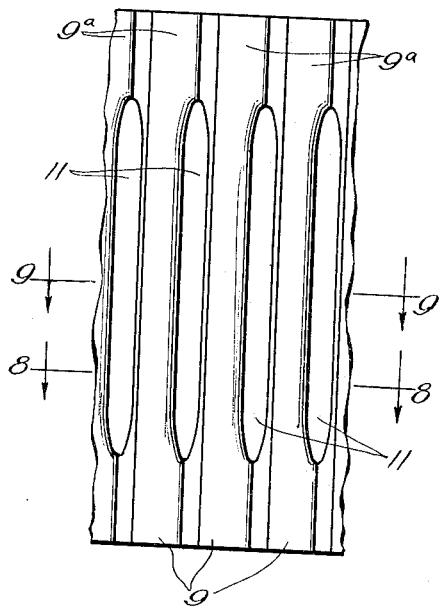
Figure 7 is a bottom view of the portion of the radiator core in Figure 6, illustrating the water tube openings of the radiator core.

The flat portions of the tops of the ridges 5, see Figures 2, 3, 8 and 9, are provided, not only to allow proper clearance between the edges 6 and the bottom of the groove formed by the ridges 5, see Figure 8, but also for the purpose of establishing a firm contact between adjacent tubes. When the radiator is assembled, as in Figure 8, the flat tops of the ridges of adjacent tubes abut one another. This makes for a firm radiator structure. In addition the effect of said flat portions is to form the water channel of approximately constant cross section.

After soldering, all of the ornamental and protective loops 3 will be firmly joined. The water tubes formed with the sheets will be sealed longitudinally along their marginal edges 10 which extend the full length of the strips and adjacent the loops 3. The edges 10 lie in the plane of and comprise a part of the original surface A. The disposition of the marginal edges and their relation to the loops and associated structure is best illustrated in Figure 6.

The cross sectional view through the assembled radiator core in Figure 8 clearly portrays the tortuous or zigzag water tubes or water legs 11, created by the sheets as described above. With this construction suitable spaces 12 are formed between and surrounded by the water channels. Since the spaces 12 are entirely surrounded by water I will hereinafter refer to them by the term water spaces or water cells, the latter term including the channel portions confining the water around the water space. This will distinguish from the space formed by the loops 3 which when joined form hexagonal air cells or air spaces 13. Furthermore, as will be explained later, the net work or grille composed of the hexagonal air cells 13 is disposed in offset relation to the symmetry of the water channels to break the air stream and to produce eddy currents within the air spaces 12 for bettering the dissipation of heat.

Figure 17 is a diagrammatic sketch illustrating the relation between the water cells 12 and the air cells or spaces 13. For the purpose of showing this relation more clearly, the air spaces or cells 13 are extended above the water channels while in the lower part of the figure the water channels 11 are extended below the air cells. It will be noted that by virtue of the zigzag or tortuous form of the water channels the spaces 12 are in the approximate formation of a diamond while the air cells 13 approximate a hexagon. This hexagon is, however, in reality a diamond, similar to the diamond formed by the water space 11, but having its ends spaced apart by a side or leg 13a. The length of this portion is substantially equal to the vertical dimension of the inclined portion of the diamond shaped water cell.

It is also to be noted, and this is also clear from Figures 6, 8 and 9, that the air cells 13 are displaced slightly with respect to the water cells 12, that is, the air cells 13 are not in axial alignment with the spaces 12. This is not only for the purpose of breaking up the air stream, but it principally arises from the structural requirement that each two strips making up one complete water channel should be identical so that there is no necessity for having to make separate dies, etc., to form right and left hand strips.

Figure 10 shows two strips which have been placed together to illustrate the identical construction referred to. Generally the strips are formed singly, but under certain conditions it may be desirable to form a plurality of strips at one operation, and the feature of having the strips identical makes this possible.

Where the two tube strips are identical, however, and are formed with zigzag corrugations, or alternate grooves 4 and ridges 6, and with one side of each strip as a contacting face B, it is necessary to do at least two things in forming a water channel. First one of the strips must be turned over to bring both of said faces B in contact, but to merely turn one strip over brings two ridges opposite one another so that said faces cannot be brought together because the ridges 6 will interfere with each other. This is illustrated in Figure 11. A second step therefore becomes necessary, namely, to move one strip longitudinally of the other to shift the ridges out of abutting relation and to bring each ridge 6 opposite a groove 4.

This will properly form the water channel, but it will now be observed that the connecting loops, assumed for purposes of illustration to be directly in line with the corrugations 4 and hence not seen in Figures 10, 11 and 12, will not now be opposite one another, and if the water channels were assembled with the tubes formed in this manner the crests of the loops of adjacent channels would not be in contact and there would be no connection between the various water channels. Actually, the loops will be spaced laterally equal to the distance $a$, see Figures 11 and 12, which represents the amount of longitudinal displacement performed in said second step. Actually this distance $a$ is equal to one-half of the distance between ridges 6, or between grooves 4, which distance may be termed $2a$, the pitch of the corrugations in the tube strips.

Figure 13:
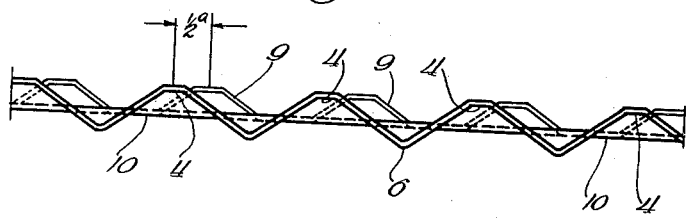
Figure 14:
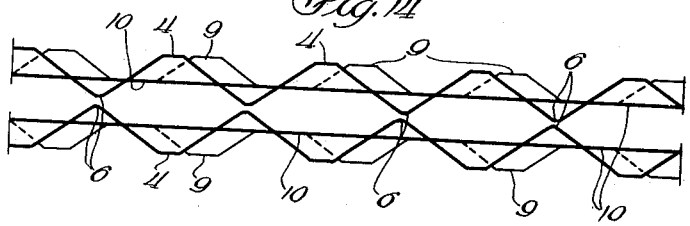
Figure 15:
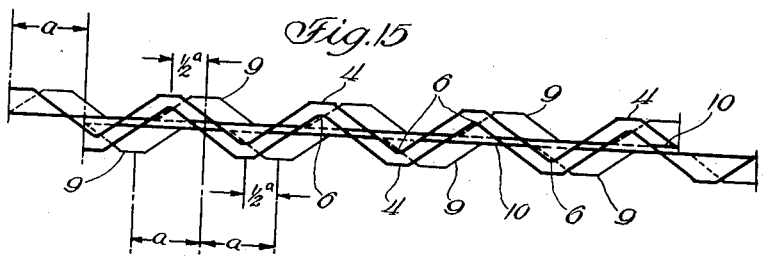

Now in order to have the connecting loops come opposite one another when the complete water channel is formed, I propose to shift the position of the loops relative to the grooves or corrugations 4 an amount equal to exactly one-half the distance $a$. The result of this is shown in Figures 13, 14 and 15. Figure 13 corresponds to Figure 10 but illustrates the actual position of the loops 9 when the strips are formed in the punching machines, this position being a distance equal to $\frac{1}{2}a$ from the center line of the corrugations 4. Now when said second step named above is performed, namely, one strip turned over with respect to the other, the result is as shown in Figure 13 which, as in Figure 11, brings the ridges 6 directly opposite one another which prevents the formation of the water channel. Here, however, the loops 9 are opposite each other, but they do not remain so because in order to form the water channel it is necessary to shift the strips relative to one another a distance equal to $a$, see Figures 14 and 15. Here again the loops 9 are not opposite one another so that were the water tubes formed in this manner there would be no means connecting the various tubes.

Figure 16:
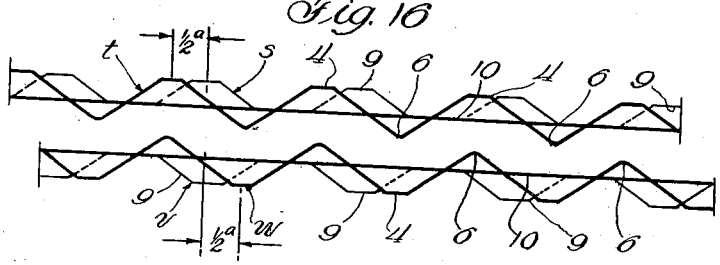

By virtue of the position of the loops being spaced $\frac{1}{2}a$ from the grooves 4 it is, however, a simple matter to perform a third step to bring the water tube sections in proper relation. This third step comprises turning one of the strips end for end. This is illustrated in Figure 16 where the upper strip remains in the same position as shown in Figures 13, 14 and 15, the lower strip being turned end for end as compared with its turned-over or reversed position in Figures 14 and 15. Hence, where one of the loops, say the one designated $s$ in Figure 16, occupied a position $\frac{1}{2}a$ to the right of its adjacent groove 4, designated $t$ in Figure 16, the companion loop $v$ on the lower strip is spaced $\frac{1}{2}a$ to the left of the groove $w$. But as explained above, alternate grooves 4 and ridges 6 are spaced from one another a distance equal to $a$ after the strips are shifted longitudinally, therefore the crests or crowns of the loops 9 of the two tube strips are now opposite one another so as to properly form a hexagonal air cell.

Referring again to Figure 17 and remembering that the loops 9 of a water tube strip are spaced from the adjacent grooves 4 a distance which was referred to above by $\frac{1}{2}a$, it will be noted that the amount of offset of the hexagonal air cells 13 with respect to the water cells 12 is approximately equal to $\frac{1}{2}a$, and it was also noted that this amount of offset relation is approximately equal to the vertical thickness of the inclined portions of the water channels 11. Hence, generally speaking, the vertical thickness of the tortuous water channel is approximately equal to the displacement of the air cells with respect to the water cells and is also approximately equal to one fourth the distance between grooves 4 which, as stated above, may be referred to as the pitch of the corrugated channel of the water tube strips.

From Figure 6 it is also apparent that there are twice as many air cells 13 as there are water cells 12. This arises because each surface of the loops is available to form one-half of a hexagonal air cell, whereas since the water cell must necessarily have thickness in an interior water receiving portion only one of the two surfaces of the corrugated channel is available to form or define the water cells; hence the ratio of air cells to water cells is two to one. This is also made apparent in Figure 18 where it will be noted that the area of two of the air cells is practically exactly equal to the area enclosed by the center line $x$ of the water cell. It will also be noted that the area enclosed by the outer walls of the water cell, Figure 18, is approximately equal to the area of three air cells and that the area enclosed by the inner walls of the water cell is equal to one air cell.

The offset of the hexagonal air cells 13 with respect to the water cells 12 is such that one end of certain air cells substantially coincides with the outer walls of one of the water cells 12. This will be understood by referring to Figure 18 where the reference character $c$ indicates such coinciding walls of the particular air cell there shown. Here will be observed also how the portions 13a of the air cells are substantially equal to the vertical thickness of the inclined channel portions of the water cell. The lower end of the particular air cell mentioned above reaches just below the mid-point of the water cell 12 shown in Figure 18, but the two adjoining air cells overlapping and extending just below the one mentioned make up a length substantially equal to the length of a water cell. It will also be noted that the width of two air cells is approximately equal to the width of one water cell.

It is to be understood that although the accompanying drawings may show the corners as being sharp, where the sheet is bent into the particular configuration illustrated, preferably I avoid as much as possible all sharp corners and even if the inner side of a bent portion of the sheet is sharp it will be understood that the outer surface thereof does not assume an absolutely sharp corner. Furthermore, extreme accuracy is not necessary when assembling the sheets, the strips being more or less self-centering by virtue of the central corrugations 8. The absolute meeting of the edges such as 10 and the loops 3 is not essential since all of the edges are dipped in solder which joins and seals these edges. The meeting edges may be tooled or scarified if desired.

It is also to be understood that where I have disclosed particular ratios and proportions for the various parts these proportions and ratios may be changed to suit the different requirements that may be encountered, although generally the form and proportions disclosed are preferable.

Although a preferred method of procedure in making up the sheets of the radiator core and the assemblage thereof has been described, it is to be understood that the order of the steps may be considerably varied without departing from the metes and bounds of the present invention. Therefore, I do not intend to be strictly limited to the specific description herein contained nor to the disclosure illustrated in the accompanying drawings, but only in so far as the appended claims appertain thereto.

What I claim is:

1. The herein described process for forming a radiator half tube out of a strip of sheet metal comprising, forming a channel lengthwise of the strip, thereby giving the strip appreciable column strength against endwise distortion, striking out the edges of the strip to form free loops along the margins thereof, corrugating the channel portion of said strips with equally pitched transverse ridges, and reducing portions of said ridges to form intermediate reenforcing corrugations extending longitudinally of the strip, said intermediate reinforcing corrugations serving to retain adjacent half tubes in proper position.

2. The herein described process for forming a radiator half tube out of a strip of sheet metal comprising, forming a central channel lengthwise of the strip, striking out the edges of the strip to form free loops along the margins thereof, alternately depressing and raising certain portions of said channel portion of the strip to form corrugations with equally pitched transverse ridges disposed alternately on opposite sides of the plane of said channel portion and forming at least one registering projection adapted to engage at least one cooperating projection on an adjacent half tube for retaining the same in proper relative position.

3. The herein described process for forming a tortuous half double tube of a radiator out of sheet metal comprising, forming a channel lengthwise of the strip, striking out the edges of the strip to form free loops along the margins thereof, corrugating the channel portion of said strips with equally pitched transverse ridges portions of which extend on opposite sides of the general plane of the strip, and further corrugating said strips with intermediate corrugations of symmetrical reverse curvatures equal in pitch to said former corrugations and coincident therewith for spacing the strips.

4. The method of manufacturing a radiator which comprises producing a half tube from a strip of material by forming a channel lengthwise of the strips, striking out portions of the marginal edges of the strips to form free loops along said edges, and corrugating the channel portion with transverse ridges, bringing adjacent half tubes together with the ridges interlocking but spaced from one another to form a liquid space, and joining said half tubes together along their meeting marginal portions laterally of the channels to enclose said liquid space.

5. The method of manufacturing a radiator which comprises producing a half tube from a strip of material by forming a channel lengthwise of the strip, striking out portions of the marginal edges of the strip to form free loops along said edges, leaving a portion of said marginal edges flat and in the original plane of the material to form a meeting edge, and corrugating the channel portion with transverse ridges projecting outwardly from the channel portion away from the original plane of the strip, joining adjacent half tubes together along their meeting portions laterally of the channels in leak-tight relation with said ridges interlocked and said loops in registry to form a liquid space of constant cross section, and joining said free loops together to reenforce the radiator.

6. The method of forming a tortuous fluid enclosing tube which comprises forming a central channel in each of two sheets, deforming said channel portion of each sheet to provide alternate ridges and grooves disposed alternately on opposite sides of the plane of the sheet, forming cooperative registering portions on each sheet, and securing said sheets together with the channels thereof facing one another and with said portions in registry whereby the ridges of one sheet are received within but spaced from the grooves of the other.

7. A radiator core made of similarly formed sheets, said sheets defining tortuous water tubes between their faces and defining staggered water-surrounded cells between their backs, said sheets having continuous joining margins at front and rear for forming water tight seams for the tubes and having regularly spaced integral loops, said loops having flat contacting portions adapted when in registry to space the sheets and contacting with each other to form reenforced connection between adjacent sheets in front of the water tubes.

8. In a sheet metal radiator tube, a pair of complementary parts each comprising a corrugated portion, joining margins along the edges of said corrugated portion, said corrugated portion consisting of ridges alternately raised and depressed relative to the original plane of the sheet, said complementary parts being joined along their marginal edges with the raised corrugations of the first of said parts disposed in offset relation to the raised corrugations of the second of said parts whereby the depressed ridges of the corrugations of said first parts are disposed within the raised corrugations of said second part and vice versa, to form a tortuous water channel through said tube, and cooperating registering means carried by said parts for positively positioning the same relatively to each other.

9. In a sheet metal radiator, a double water tube comprising a pair of complementary parts each having a corrugated portion, joining margins along the edges of said corrugated portion, said corrugated portion consisting of ridges alternately raised and depressed relative to the original plane of the sheet, said complementary parts being joined along their marginal edges with the raised corrugations of the first of said parts disposed in offset relation to the raised corrugations of the second of said parts whereby the depressed ridges of the corrugations of said first parts are disposed within the raised corrugations of said second part and vice versa, to form a tortuous water channel through said tube, and cooperating registering means carried by said parts for positively positioning the same relatively to each other, said cooperating registering means forming a partition longitudinally of said parts to divide said tortuous water channel into a double longitudinal water compartment.

10. A radiator having tubes provided with zigzag water passages of approximately constant cross section and being formed of separate but identical strips in duplicate, said strips having loops at the front and back edges extending transversely of the general plane of each strip and contacting only with the loops of adjacent strips, means for sealing the marginal portions of said strips to define the water passage therebetween, and means associated with said strips and operative before the latter have been sealed to bring said strips to the proper relative longitudinal position and to retain the strips in that position prior to the application of said sealing means to form said zigzag water passages.

11. A radiator consisting of pairs of connected strips defining tortuous water channels, portions of adjacent channels being in contact to thereby define substantially diamond shaped water-surrounded cells extending through the radiator, and means on the edges of said strips for defining a similarly shaped pattern for the face of the radiator, the openings of said pattern being slightly out of registry with the openings of said air cells.

12. A radiator core comprising a plurality of water tubes, each tube made of similarly formed strips having a number of transverse ridges, means sealing the edges of said strips together, and connecting loops on the edges of said strips, said loops being spaced from said ridges longitudinally of the strip a distance approximately equal to one fourth the pitch of said ridges.

13. A radiator core comprising a plurality of water tubes, each tube made of similarly formed strips having a number of alternate depressed and raised portions, means sealing the edges of said strips together, connecting loops on the edges of said strips, means spacing the strips so that the crowns of said loops are disposed subtantially midway between said alternate depressed and raised portions.

14. The method for forming a tortuous tube of a radiator out of a pair of sheet metal strips which comprises alternately depressing and raising the central portion of the strips to form identical corrugations, the depressed portions of each strip being displaced farther from the original plane of the strip than the raised portions, striking out marginal portions of the strips to form identical free loops, turning one strip over and end for end relative to the other strip to bring the raised portion of one strip opposite a depressed portion of the companion strip and to bring the crowns of the loops opposite to one another, and joining the edges of said strips.

15. A radiator having tubes provided with zigzag water passages of approximately constant cross section and being formed of identical strips in duplicate, said strips having loops at the front and back edges, said loops extending transversely of the general plane of each strip and contacting only with the loops of adjacent strips, the loops forming cellular air passages of general hexagonal formation, three of said passages being arranged to approximately equal one of the water passages in length and width.

16. A radiator comprising a plurality of water tubes, each tube being formed of a pair of separate flat strips having contacting marginal edges and central transverse corrugations formed in the material of the strips and registering corrugations intermediate the opposite marginal edges of the strips and adapted, when the strips are brought together to define a water tube, to contact with one another to reenforce the water tube and to define the thickness of the water channel therein.

17. A radiator comprising a plurality of water tubes, each tube being formed of a pair of flat strips having contacting marginal edges and transverse corrugations formed in the central portion of the strips, intermediate portions of said corrugations being more shallow than others so that when the strips are brought together to define a water channel therebetween, said last named portions contact with one another to space the strips.

18. A radiator consisting of a plurality of pairs of radiator half tubes secured together, each of said half tubes formed of a strip of sheet material having a central channel disposed lengthwise thereof and undeformed marginal portions on opposite sides of said channel, sections of the edges of said marginal portions being struck from the body of the strip to form a plurality of registering loops along the edges of said marginal portions, and equally pitched transverse ridges formed in said channel portion, portions of said ridges extending outwardly from the channeled section and away from the plane of the marginal portions of the strip.

19. A radiator consisting of a plurality of pairs of radiator half tubes secured together, each of said half tubes formed of a strip of sheet material having a central channel disposed lengthwise thereof and marginal portions on opposite sides of said channel, sections of the edges of said marginal portions being struck from the body of the strip to form a plurality of loops along the edges of said marginal portions, and equally pitched transverse ridges formed in said channel portion, portions of said ridges extending outwardly from the channeled section and away from the plane of the marginal portions of the strip, and certain portions of said transverse ridges being reduced to form intermediate longitudinally extending reenforcing corrugations which extend along said ridges longitudinally of the strip.

20. A radiator comprising a plurality of water passages formed by a pair of connected radiator half tubes, each of said half tubes comprising a strip of sheet metal having formed therein a central channel longitudinally of the strip with marginal portions on opposite sides of the channel, certain portions of said channel being alternately depressed and raised to form corrugations in the channel disposed alternately on opposite sides of the plane of said channel portion, and means to space said corrugations, the two half tubes comprising a water passage and being connected together at their marginal portions with the corrugations of the channel sections forming a tortuous channel disposed first on one side and then on the other of the plane of the marginal portions of the connected strips.

21. A radiator having interconnected tortuous water channels, said radiator comprising a plurality of pairs of radiator half tubes formed of sheet metal and each having a channel formed centrally thereof and longitudinally of said sheet, the channel portion of each of said half tubes being corrugated with transverse ridges, portions of which extend on opposite sides of the general plane of the sheet, the intermediate sections of said transverse ridges being provided with corrugations of symmetrical reverse curvature equal in pitch to the corrugations of said transverse ridges and coincident therewith, and means for securing the radiator tubes together comprising loops struck from the marginal portions of said sheets on opposite sides of said centrally disposed channel.

22. A radiator comprising a plurality of interconnected pairs of radiator half tubes, each of said tubes being formed from a strip of material having a channel formed therein and extending longitudinally of the strip, loops struck from the marginal edges of said strip, the remaining portion of said marginal edges being flat and disposed in the original plane of the strip to form a meeting edge on each of said radiator half tubes, said channel portion of each of said half tubes being corrugated with transverse ridges projecting outwardly from the channel portion and away from the original plane of the strip, the half tubes of each pair being connected together along said meeting edges with the transverse ridges thereof interlocked to form a tortuous liquid space of substantially uniform cross-section, and means securing said loops together to reenforce the radiator and to secure the radiator tubes together to form a substantially rigid unit.

23. A radiator comprising a plurality of tubes having tortuous water channels, each of said tubes comprising a pair of strips having formed therein alternate grooves and ridges in the central portions thereof with the depth of the grooves exceeding the height of the ridges relative to the original plane of the strips, the marginal portions on opposite sides of said grooves and ridges being continuous and substantially flat, means securing said strips together along their marginal edges with the ridges of one strip seated in the grooves of the other strip and with the crest of each ridge being out of alignment with the invert of each groove a distance approximately equal to the difference between the height of the ridges and the depth of the grooves, whereby the water channel is of substantially uniform cross-section.

24. A radiator comprising a plurality of radiator tubes having tortuous water channels, each of said tubes comprising a pair of interconnected strips having grooves and ridges formed in the central portions thereof with the depth of the grooves exceeding the height of the ridges relative to the plane of the margins of the strips on opposite sides of the central portions thereof, said marginal portions being disposed in the original plane of the strips, abutment projections formed on at least one of the strips of each pair, and means securing said strips together along their marginal edges with the ridges of one strip seated in the grooves of the other strip, the crest of each ridge being out of alignment with the invert of each groove a distance approximately equal to the difference between the height of the ridges and the depth of the grooves, said abutment projections serving to space the strips in proper longitudinal position relative to each other whereby the water channel formed by the pairs of strips is of substantially uniform cross-section.

FRED M. OPITZ.